(12) United States Patent
Geupel

(10) Patent No.: US 8,090,410 B2
(45) Date of Patent: Jan. 3, 2012

(54) METHOD FOR AUTHENTICATION OF A USER ON THE BASIS OF HIS/HER VOICE PROFILE

(75) Inventor: Hermann Geupel, Munich (DE)

(73) Assignee: VoiceCash IP GmbH, Zurich (CH)

( * ) Notice: Subject to any disclaimer, the term of this patent is extended or adjusted under 35 U.S.C. 154(b) by 0 days.

(21) Appl. No.: 12/804,557

(22) Filed: Jul. 23, 2010

(65) Prior Publication Data
US 2010/0291901 A1 Nov. 18, 2010

Related U.S. Application Data

(62) Division of application No. 10/987,963, filed on Nov. 12, 2004, now Pat. No. 7,801,508.

(30) Foreign Application Priority Data

Nov. 13, 2003 (DE) .................................. 103 53 068

(51) Int. Cl.
H04B 1/38 (2006.01)
(52) U.S. Cl. ...... 455/558; 455/511; 455/563; 379/88.01
(58) Field of Classification Search .................. 455/411, 455/558, 568, 466, 414.1, 410, 56; 704/201, 704/231, 270, 273; 370/468, 329, 347; 379/88.01
See application file for complete search history.

(56) References Cited

U.S. PATENT DOCUMENTS

| 5,742,910 | A | 4/1998 | Gallant et al. |
| 5,930,700 | A | 7/1999 | Pepper et al. |
| 6,151,576 | A | 11/2000 | Warnock et al. |
| 6,178,403 | B1 | 1/2001 | Detlef |
| 6,182,076 | B1 | 1/2001 | Yu et al. |
| 6,185,536 | B1 | 2/2001 | Haber et al. |
| 6,393,403 | B1 | 5/2002 | Majaniemi |
| 6,400,967 | B1 | 6/2002 | Nilsson |
| 6,459,910 | B1 | 10/2002 | Houston |
| 6,532,446 | B1 * | 3/2003 | King ........................... 704/270.1 |
| 6,570,871 | B1 * | 5/2003 | Schneider ..................... 370/356 |
| 6,757,296 | B1 | 6/2004 | Larsson et al. |
| 6,871,063 | B1 | 3/2005 | Schiffer |
| 6,901,270 | B1 | 5/2005 | Beach |

(Continued)

FOREIGN PATENT DOCUMENTS

EP 1 074 974 2/2001

(Continued)

OTHER PUBLICATIONS

European Search Report issued Jan. 21, 2005.

Primary Examiner — Cong Tran
(74) Attorney, Agent, or Firm — Collard & Roe, P.C.

(57) ABSTRACT

Voice recording used for authentication is transmitted to the voice portal of the service provider not by way of the voice channel, but rather by way of a data channel. In this connection, the voice recording is sent not synchronous to speech and subject to loss, but rather asynchronously and loss-free, in an extra data package (for example advantageously as a Multimedia Messaging Service (MMS) data package). For this purpose, the resources that are available as standard items in most mobile phone terminals, such as digital voice recording and MMS transmission, can be utilized. Preferably, the subscriber's identification module or SIM card in the mobile phone terminal can store and implement the corresponding control program.

5 Claims, 1 Drawing Sheet

U.S. PATENT DOCUMENTS

| | | |
|---|---|---|
| 6,970,817 B2 | 11/2005 | Ross et al. |
| 7,013,155 B1 | 3/2006 | Ruf et al. |
| 7,024,359 B2 * | 4/2006 | Chang et al. .................. 704/251 |
| 7,092,880 B2 | 8/2006 | Ivanic et al. |
| 7,437,287 B2 | 10/2008 | Kim |
| 2001/0004589 A1 | 6/2001 | Massy et al. |
| 2001/0044314 A1 | 11/2001 | Martensson et al. |
| 2002/0107049 A1 | 8/2002 | Maquaire et al. |
| 2002/0164978 A1 | 11/2002 | Moskowitz et al. |
| 2003/0033143 A1 | 2/2003 | Aronowitz |
| 2003/0046083 A1 | 3/2003 | Devinney et al. |
| 2003/0107592 A1 | 6/2003 | Li et al. |
| 2003/0187655 A1 | 10/2003 | Dunsmuir |
| 2004/0092272 A1 | 5/2004 | Valloppillil |
| 2004/0121813 A1 | 6/2004 | Colson et al. |
| 2005/0009567 A1 * | 1/2005 | Holmes .......................... 455/563 |
| 2005/0080627 A1 | 4/2005 | Hennebert et al. |
| 2005/0100023 A1 * | 5/2005 | Buckwalter .............. 370/395.52 |

FOREIGN PATENT DOCUMENTS

| | | |
|---|---|---|
| EP | 1 271 908 | 1/2003 |
| GB | 2 401 209 | 11/2004 |
| WO | WO 00/28721 | 5/2000 |
| WO | WO 03/075540 | 9/2003 |

* cited by examiner

METHOD FOR AUTHENTICATION OF A USER ON THE BASIS OF HIS/HER VOICE PROFILE

CROSS REFERENCE TO RELATED APPLICATIONS

This application is a divisional application of U.S. patent application Ser. No. 10/987,963 filed Nov. 12, 2004, which claims priority under 35 U.S.C. §119 on German Application No. 103 53 068.1 filed Nov. 13, 2003.

BACKGROUND OF THE INVENTION

1. Field of the Invention

The present invention relates to a method for authentication of a user on the basis of his/her voice profile, particularly with the use of a mobile phone. Furthermore, the invention relates to a subscriber's identification module or SIM card for controlling such a method.

2. The Prior Art

Voice portals are gaining increasing significance. Because of the further development of speech recognition technology and because of the competition on this sector, call center services are being increasingly automated. Banks offer account status information, stock trading, and transfers via voice portal. Telecommunications providers make the Internet accessible by voice, via so-called Voice XML (extensible markup language).

For many services, the user must first prove his/her identity, i.e. must authenticate himself/herself. Conventional authentication by way of a secret number or a password, usually referred to as a PIN (Personal Identification Number), creates problems. These problems are created particularly if the service is used infrequently, if the user forgets his/her PIN, and consequently does not use the service, or if the user does not like to use the service, because of complicated PIN re-set procedures. Furthermore, there is the not insignificant security risk that an unauthorized third party will spy out the PIN and will gain access to the services of the aforementioned type, in place of the authorized user. Therefore voice service providers are beginning to authenticate the user by way of his/her voice profile. This form of authentication, referred to as voice authentication hereinafter, has obvious advantages with regard to the aspect of user acceptance. The user no longer needs to remember any secret data. He/she is guided through a short authentication dialog in the conversation with the computer that he/she has to conduct in any case. Subsequently the user receives access to the appropriate service, depending on the result of the voice check.

Fundamentally, there is the possibility of using the mobile phone terminal (handset), something that a user generally has, for utilizing the voice services and for a related voice authentication. However, the mobile phone does not offer a uniform voice transmission quality. In the case of weak field intensity, voices can be distorted and interference noises can be generated. Voice recognition, i.e. a check of characteristic voice characteristics for authentication, reacts to this distortion and noise more sensitively than speech recognition, i.e. the recognition of spoken information. Field tests show a relatively high so-called False Rejection Rate (false rejection of an authentic user) in mobile phone networks, and this high False Rejection Rate makes the use of mobile phone terminals for voice authentication questionable, in general.

Aside from the usual approach of obtaining a voice profile of the user on the provider side, from the transmitted voice signal, and comparing it with the reference voice profile of the user, another approach is also known. In this approach, the reference voice profile is stored on the subscriber's identification module or SIM card of the mobile phone terminal and the check algorithm is allowed to run on this SIM card. However, in view of the common memory space on SIM cards, great losses with regard to the quality of the reference voice profile and the check algorithm must be accepted. These losses in turn lead to high error rates and therefore make practical use fundamentally questionable.

SUMMARY OF THE INVENTION

Since the usability of voice services, also away from home, is of great interest for both users and providers, it is an object of the present invention, in view of the problems of the conventional technology as described above, to provide a method that permits the use of a mobile phone for voice authentication, with greatly increased reliability as compared with the state of the art. The method should be inexpensive to implement, and should protect the user from having to acquire extensive and expensive hardware. Accordingly, it is furthermore an object of the invention to create suitable accessories that allow implementation of such a method, using a commercially available mobile phone.

According to one aspect of the present invention, this object is accomplished with a method for authentication of a user on the basis of his/her voice profile in which a voice sample of the user is recorded by means of a microphone of a mobile terminal, the voice sample is transmitted to a server in the form of at least one separate data package, by way of a mobile phone network, and the voice sample is checked by means of the server. Advantageous embodiments of the method are discussed below.

According to another aspect of the present invention, this object is accomplished with a subscriber's identification module (or SIM card) for a mobile phone, which contains a control program that controls recording of a voice sample of the user of the mobile phone by means of a microphone of the mobile phone and transmitting of the voice sample to a server in the form of at least one separate data package by way of a mobile phone network. A commercially available mobile phone can therefore be re-fitted by simply replacing the SIM card or by reloading the software at the purchase location (point of sale) or wirelessly ("over the air"). In a manner that is surprising for a person skilled in the art, the error susceptibility in voice authentication is reduced by several orders of magnitude, as compared with the state of the art. Advantageous embodiments of the SIM card according to the invention are discussed below.

The invention is based on the transmission of the voice recording used for authentication to the voice portal of the service provider not via the voice channel, but rather by way of a data channel. In this connection, the voice recording is sent not synchronous to speech, and therefore subject to loss, but rather asynchronously and loss-free, in an extra data package (for example advantageously as a Multimedia Messaging Service (MMS) data package). For this purpose, the resources that are available as standard items in most mobile phone terminals, such as digital voice recording and MMS transmission, can be utilized. Preferably, the SIM card in the mobile phone terminal can store and implement the corresponding control program.

The method according to the invention offers the advantage of being able to send the voice sample required for voice authentication over the mobile phone network in loss-free manner. Transmission-related errors in the authentication are precluded, to a great extent, in this way. Transmission-related signal interference no longer needs to be taken into consideration in determining the tolerance of the actual authentication procedure. Therefore, the threshold of the required agreement between the voice sample and the reference voice profile that allows access can be set lower. This feature makes it possible to increase the security that can be achieved.

The separate data package or packages may be generated using a speech recognition function that is implemented on the terminal or mobile phone side.

The method according to the invention furthermore surprisingly offers a solution approach for the much-discussed cross-channel problem in the voice authentication industry. This problem is understood to mean that the characteristics of the transmission segment between the user and the voice server (the microphone, the phone itself, the transmission channel, etc.) distort the voice recording. If the conditions that occur during recording of the reference voice profile differ from those during recording of a voice sample, within the scope of an authentication procedure, the voice is distorted in different ways. This distortion can result in higher error rates. By means of consistently using one's own mobile phone terminal, in accordance with the method according to the invention, a uniform, loss-free voice transmission, without cross-channel effects, is guaranteed. It is helpful, in this connection, if the user uses the same mobile phone terminal to record the reference voice profile as the one used for subsequent authentication. If the user changes his/her mobile phone terminal, a new enrollment might be advisable, under some circumstances, in order to achieve a lower error rate.

If the voice server asks the user to provide several voice samples, one after the other, in order to achieve lower error rates, sending of the voice sample from the mobile terminal to the voice server can take place parallel in time with the continued dialog between the voice server and the user. In this way, a possible waiting time for the user can be avoided or reduced.

The method according to the invention offers the possibility of including the mobile phone terminal in the most varied authentication environments, as a biometric sensor. Examples are resetting passwords, security-sensitive voice portal services, additional or alternative authentication for data access via the Internet. Furthermore, use for governmental purposes, as an alternative/complement to fingerprints, is possible. A voice profile offers relatively greater accuracy and allows a test that the person speaking is living, if randomly selected words have to be repeated. This feature provides a guarantee that no recording made before the individual authentication procedure is being used. The user may be requested by the server, for the purpose of recording the voice sample, to make a statement that is selected from a number of possible statements, without the user being able to exert any influence.

DETAILED DESCRIPTION OF PREFERRED EMBODIMENTS

Figure 1:
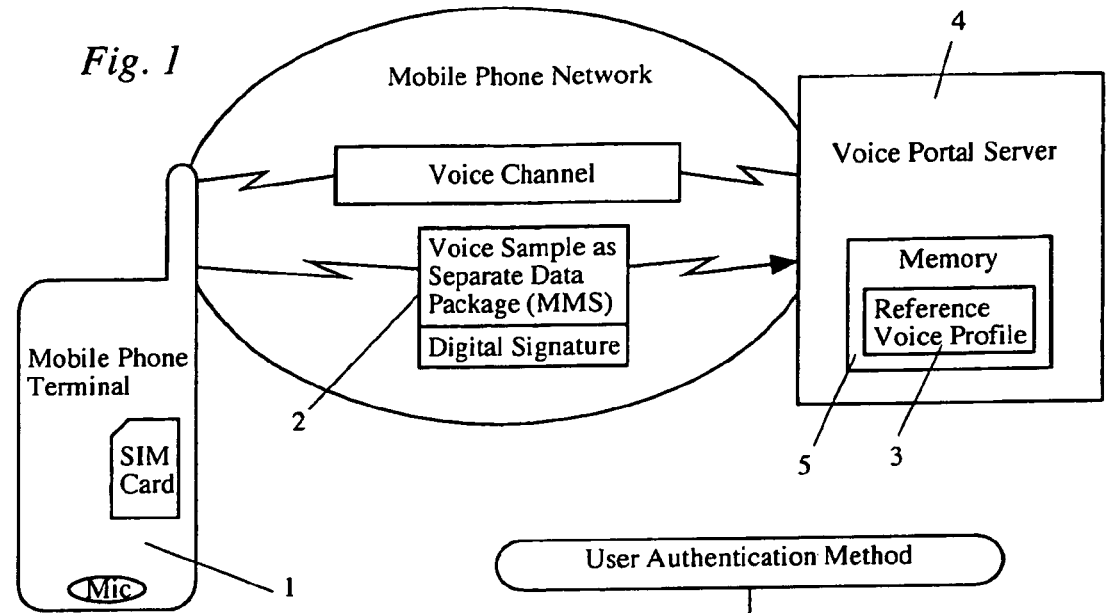
FIG. 1 visualizes, schematically and by way of example only, the interaction, according to the present invention, between a mobile phone terminal and a voice portal server.
Figure 2:
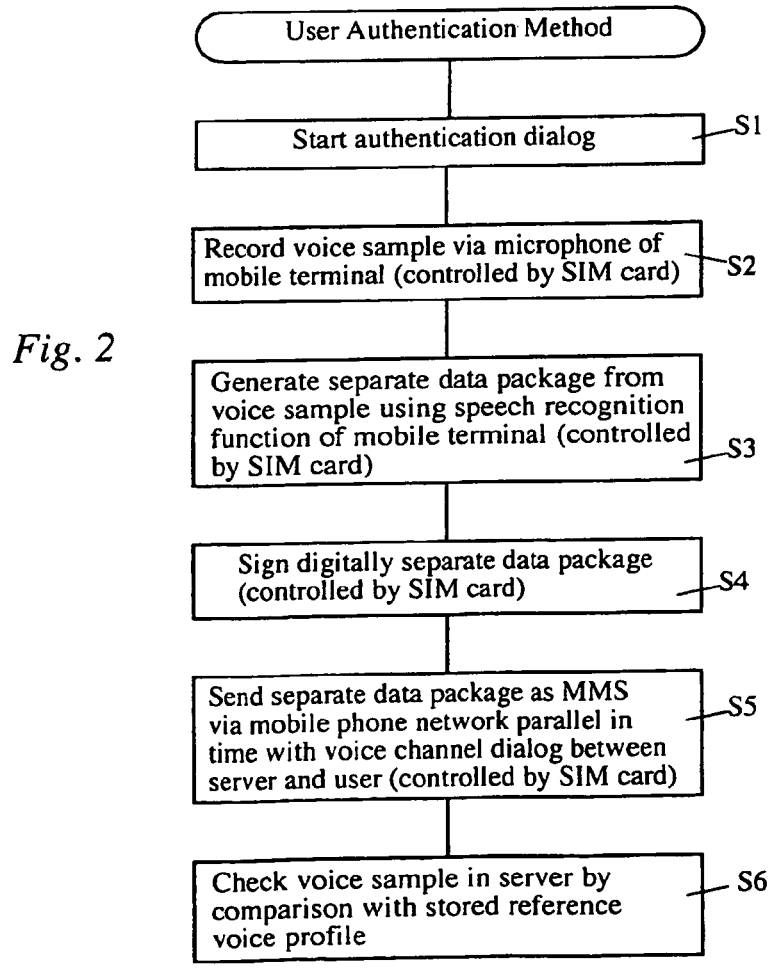
FIG. 2 is a flow chart of an embodiment of a method according to the present invention.

A particularly preferred embodiment of the invention will be briefly explained in detail below.

A user who wishes to use a specific service via his/her mobile phone 1 dials up the corresponding voice portal 4 of the service provider. After a connection is made, an authentication dialog is started by the voice portal 4 (Step S1). To record a voice sample that serves for authentication of the user, a corresponding control program is started by the voice portal 4, in secure manner by way of a mobile phone data channel (for example, advantageously via a Secure Sockets Layer (SSL) connection, an SSL-like connection, or a similar connection).

This connection preferably at least equalizes reduced bandwidths of the transmission channel not by means of compression, which is free of time delays and subject to loss, but rather by extending the required transmission time. This connection also preferably operates without transmission methods that are subject to loss. A voice sample of the user is recorded (Step S2) in the mobile phone terminal 1 over an established time window having a length of preferably at least one second, particularly preferably between two and six seconds, ideally approximately two seconds. The voice sample is transmitted to a server in the form of at least one separate data package using a speech recognition function that is implemented at the mobile terminal 1 (Step S3). The voice sample is preferably digitally signed (Step S4) and preferably sent to the voice portal 4 as an MMS message 2 (Step S5). There, the voice sample is compared with the reference voice profile 3 of the user that has been stored in memory 5 (Step S6), and a decision is made concerning access to the service (e.g. voice service), whereby known commonly used voice recognition or voice comparison algorithms can be used. The user has been authenticated within a few seconds.

While at least one embodiment of the present invention have been shown and described, it is to be understood that many changes and modifications may be made thereunto without departing from the spirit and scope of the invention as defined in the appended claims.

What is claimed is:

1. A subscriber's identification module (SIM) card for a mobile phone, comprising a control program that controls the following steps:
   (a) establishing a voice connection via a voice channel of a mobile network,
   (b) recording a voice sample of a user of the mobile phone, by means of a microphone of the mobile phone; and
   (c) transmitting to a server, asynchronously to speech and parallel in time with the course of a speech dialog transmitted through said voice connection, the voice sample as at least one separate data package via a data channel of the mobile phone network, wherein reduced bandwidths of the data channel are compensated by extending transmission time of the voice sample.

2. The SIM card as recited in claim 1, wherein the at least one separate data package is generated using a speech recognition function implemented at the mobile phone.

3. The SIM card as recited in claim 1, wherein the voice sample is transmitted as a Multimedia Messaging Service (MMS) message.

4. The SIM card as recited in claim 1, wherein the control program can be activated by means of authentication of the server to the SIM card and subsequent instructions for recording and transmitting the voice sample.

5. The SIM card as recited in claim 1, wherein the SIM card has a function for digital signing of the at least one data package.

* * * * *